United States Patent [19]

Hoehn

[11] Patent Number: 4,615,274
[45] Date of Patent: Oct. 7, 1986

[54] INDEXING CONVEYOR FOR ROBOTIC PRODUCTION OPERATIONS

[76] Inventor: Robert A. Hoehn, 9230 E. 47th St., Kansas City, Mo. 64133

[21] Appl. No.: 393,428

[22] Filed: Jun. 29, 1982

[51] Int. Cl.$^4$ .................. B61B 13/12; B65G 37/00
[52] U.S. Cl. ........................ 104/167; 104/48; 198/465.1; 198/468.1; 198/746
[58] Field of Search ............ 198/472, 746, 747, 343, 198/736, 465.1, 468.1; 104/166–167, 172 B, 172 S, 48, 90

[56] References Cited

U.S. PATENT DOCUMENTS

| | | | |
|---|---|---|---|
| 3,179,064 | 4/1965 | Dehne | 104/172.5 |
| 3,267,875 | 8/1966 | Chabassier et al. | 104/167 |
| 3,811,385 | 5/1974 | Johnson et al. | 104/167 |
| 3,842,961 | 10/1974 | Burson | 104/167 X |
| 3,882,792 | 5/1975 | McIntier | 198/472 |
| 4,277,217 | 7/1981 | Miller et al. | 198/746 X |
| 4,408,540 | 10/1983 | Dehne | 104/172 B |

FOREIGN PATENT DOCUMENTS

| | | | |
|---|---|---|---|
| 0030882 | 6/1981 | European Pat. Off. | |
| 2048246 | 4/1971 | Fed. Rep. of Germany | |
| 8000559 | 4/1980 | World Int. Prop. O. | 198/465.1 |
| 958693 | 5/1964 | United Kingdom | |

Primary Examiner—David A. Scherbel
Assistant Examiner—Donald T. Hajec
Attorney, Agent, or Firm—D. A. N. Chase; Michael Yakimo, Jr.

[57] ABSTRACT

The invention provides an efficient and economical way for indexing products from a continuously moving chain conveyor to a stationary position for robotic operations and then returning the product to the moving chain conveyor. Indexing is achieved by a moveable shuttle carriage which is propelled along the axis of a main drive shaft through the engagement of a follower, located beneath the shuttle carriage, with a helical recess in the circumference of the shaft. Controlled acceleration, deceleration and positioning are accomplished by varying the rotational speed of a uniform helical drive shaft or by the use of a variable helical drive shaft rotated at constant speed. The shuttle carriage picks up a product carrier by engagement of a drive dog with the carrier to propel the carriage and carrier in unison to an operating station along tracks in parallelism with the axis of the shaft. Several indexing units may be employed in tandem to provide accumulation of products and to transfer each product back to the moving conveyor after the operation has been performed.

19 Claims, 11 Drawing Figures

INDEXING CONVEYOR FOR ROBOTIC PRODUCTION OPERATIONS

BACKGROUND OF THE INVENTION

The present invention relates generally to the successive indexing of products to an operating station and, in particular, to the indexing of products from a moving conveyor system to a stationary position for operations thereon performed by robots and then returning the products to the moving conveyor system.

Most industrial robots are designed to perform operations on products under fabrication only when the products are stationarily positioned at the robot station, whereas most manual production operations are performed while the products are continuously moving. The integration of robotic operations with manual operations in the same manufacturing or assembly facility has, therefore, created the need for conveyor systems capable of both continuous and intermittent movement.

The integration of robots with moving conveyors requires that the products be disengaged from a continuously moving constant speed conveyor, then rapidly indexed to a stationary position at a robot, and then, after the robotic operation is complete, the products must be reinserted into the identical sequence on the conveyor. The disengagement, indexing, robotic operation and return of the product must all be accomplished within the time limits established by the speed of the moving conveyor (i.e., in a conveyor system which operates at 60 product assemblies per hour, a total cycle time of one minute is available).

The design objective of such an integrated conveyor system is to provide a means of indexing products from the moving conveyor to the stationary position at a robot station in a smooth and safely controlled manner while allowing the maximum amount of the total time cycle for the operation of the robot. Time, therefore, is a critical factor. Furthermore, the system should have the ability to isolate the robot from the moving conveyor such that minor delays in robot functions do not cause the moving conveyor to stop; the ability to accomodate singular or multiple robot stations; the ability to accomodate additional stations in the future; and should require a minimum of factory floor space for installation of the system.

Prior methods of transferring products from a moving conveyor to a stationary position have consisted of separate chain conveyors which index and stop at the robots, or a system known as "Cartrak" which utilizes specially designed pallets which index by the interaction of a mechanism on each pallet with a continuously rotating drive tube. The prior art indexing chain conveyor requires that all products be indexed simultaneously, thereby requiring excessively oversized drive power units and also directly linking the robot time cycle to the continuously moving conveyor timing. Thus, if the robot malfunctions the conveyor immediately stops, which is extremely costly in manufacturing and assembly facilities. Indexing chain conveyors also typically require large pits in the plant floor to connect the chain in a loop and to mount the drive machinery.

The Cartrak system requires separate automatic or manual handling apparatus to transfer the products from the continuously moving conveyor to the separate Cartrak pallets and back onto the moving conveyor, plus an additional length of the Cartrak system is required to return empty pallets to the system start point, thus Cartrak requires excessive amounts of floor space and is costly. Therefore, these prior methods of transferring products for robotic operations have proven to be complicated and expensive.

It is, therefore, an important object of this invention to provide a positive means of rapidly indexing products for stationary robotic or other automated operations from a moving conveyor and then returning the products to the moving conveyor, without the complexity and expense characteristic of the prior systems discussed above.

Another important object of this invention is to provide an indexing conveyor that employs a shuttle characterized by positive acceleration, deceleration, and positioning with high speed indexing.

Still another important object of this invention is to provide an indexing conveyor having low energy usage and low horsepower requirements due to the mechanical advantages realized through utilization of a helically threaded drive shaft.

Yet another important object of this invention is to provide an indexing conveyor system which allows robots or other automated operations to be easily integrated with traditional assembly line operations both in new and existing facilities, and to provide such a system that is easily expanded or relocated for future use.

Furthermore, another important object of this invention is to provide an indexing conveyor which requires no pitwork or costly product transfers to separate pallets, and minimizes the plant floor space required to accomplish indexing.

Finally, another important object of this invention is to provide an indexing conveyor which operates independently of the main moving conveyor production lines, thereby reducing costly plant downtime.

Accordingly, the present invention is directed to an efficient and economical means of indexing products from a continuously moving conveyor to a stationary position for robotic operations or other operations requiring a stationary product, and then returning them to the moving conveyor if necessary.

For example, in an automotive assembly plant car bodies are typically conveyed on four-wheeled dollies which are towed along a floor track by a continuously moving chain conveyor. The present invention would index a car body placed on the four-wheeled dolly to the robot station and present both as a unit in a stationary position so the operation by the robot can be performed.

Briefly, the present invention comprises a movable shuttle carriage which receives the dolly or other product carrier and is propelled along the axis of a main drive shaft through the engagement of followers, located beneath the shuttle carriage, within a helical recess or thread in the circumference of the drive shaft. The controlled acceleration, deceleration, and positioning of the shuttle carriage and thereby the dolly are accomplished either by varying the rotational speed of a uniformly threaded drive shaft through the use of a variable speed motor, or by utilizing a variably threaded drive shaft driven by a constant speed motor. As the dolly bearing an automobile body product, for example, approaches the shuttle carriage by conveyance on the continuously moving chain conveyor, the chain conveyor disengages from the dolly at the pickup point of the shuttle. A pusher dog mounted on the shuttle carriage then engages the dolly to accelerate the coupled dolly and carriage upon rotation of the drive shaft. The dolly with product may be accelerated to a linear speed in excess of 200 feet per minute; then as the product approaches the robot station the shuttle carriage is decelerated until the dolly with product thereon stops at the robot station.

While the robot is performing its production operation, the shuttle carriage returns to its home position, the pickup point, to await the next dolly with an automobile body thereon. Meanwhile a subsequent, independent indexer unit placed in line with the operating station indexer unit engages the dolly and, upon completion of the robot operation, transfers it from the operating station, such as to a subsequent station or to a position for re-engagement with the moving chain conveyor.

In many applications two or more indexer units or sections in tandem will precede the robot operating station indexer unit to provide accumulation of the dollies. Additional indexing sections may also be included to provide accumulation as desired at other stages of the indexing conveyor system. In other applications, however, particularly those not associated with assembly lines, a single indexing unit of the present invention may meet the requirements of a given application.

THE CONVEYOR SYSTEM IN GENERAL

Figure 5:
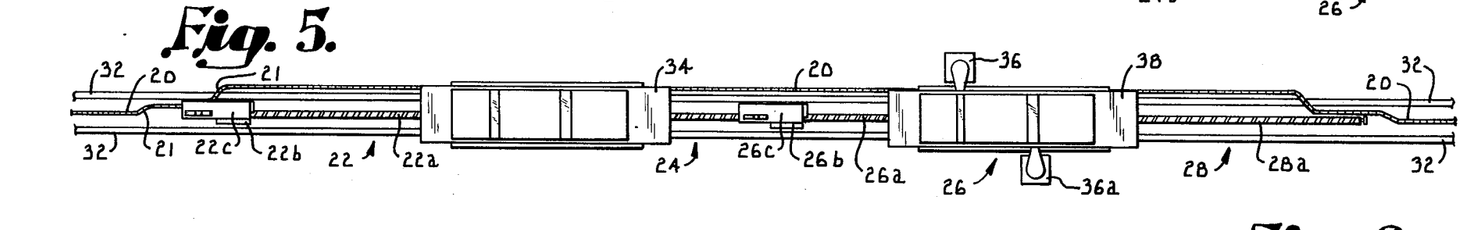
FIG. 5 is a diagrammatic, plan view of the indexing conveyor showing four indexing sections in tandem and the bypassing of a moving conveyor around the indexing conveyor sections.
Figure 6:
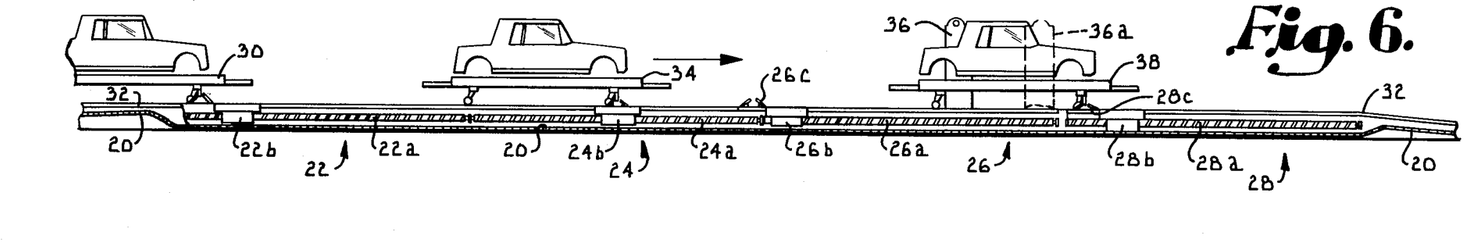
FIG. 6 is a diagrammatic, elevational view of the four-section indexing conveyor shown in FIG. 5, illustrating the accumulation of dollies and their products in the first two sections.

In the drawings as seen in FIGS. 5 and 6, the conveyor system comprises a moving chain conveyor 20 and four independent, tandem indexer units or sections, i.e., first accumulator unit 22; the second accumulator unit 24; the operating station unit 26; and the transfer unit 28. Each of the above independent indexer units employs a uniform helical drive shaft, i.e., the first accumulator drive shaft 22a; the second accumulator drive shaft 24a; the operating station drive shaft 26a; and the transfer drive shaft 28a. In each of the above indexer units is located a shuttle carriage that is propelled by its respective drive shaft. The shuttle carriages are, respectively, the first accumulator shuttle carriage 22b; the second accumulator shuttle carriage 24b; the operating station shuttle carriage 26b; and the transfer shuttle carriage 28b. It should be noted that in the plan view of FIG. 5 the second accumulator shuttle carriage 24b and the transfer shuttle carriage 28b can not be seen because they are hidden by the overlying dolly and automobile body.

As can be seen in FIG. 6 a dolly 30 (far left) has disengaged from the moving chain conveyor 20 and is engaged with shuttle carriage 22b for rightward indexing on the first accumulator unit 22. Note that the dolly 30 is not shown in the plan view of FIG. 5 in order that the disengagement layout of the moving chain conveyor 20 from the dolly 30 could be shown. This is accomplished by "wiping out" the chain conveyor 20 in a conventional manner by offsets 21 in the chain track which detour the chain so that it by-passes the indexing conveyor on the left side thereof as viewed in FIG. 5 looking in the direction of advancement of the conveyor system. The dolly 30 rolls rightwardly on a floor track 32 having elevated rails over the portion of the system spanned by the indexing conveyor. A dolly 34, seen in the second accumulator unit 24, can be seen rolling on the same floor track 32 and moving in a rightward direction. Shuttle carriage 26b in the operating station unit 26 is located at its home position in order to receive dolly 34 for continual movement thereof rightwardly and indexing at the robot operating station for stationary positioning. Robots 36 and 36a are illustrated, where 36 is a robot for placement of a rear windshield on an automobile and 36a is for placement of a front windshield on an automobile, as shown in FIGS. 5 and 6. A dolly 38 has had the robots perform their operations on the product it carries and the transfer shuttle carriage 28b has engaged dolly 38 to transfer dolly 38 rightwardly for re-engagement of the dolly 38 with the moving chain conveyor 20.

OPERATING STATION UNIT

Figure 1:
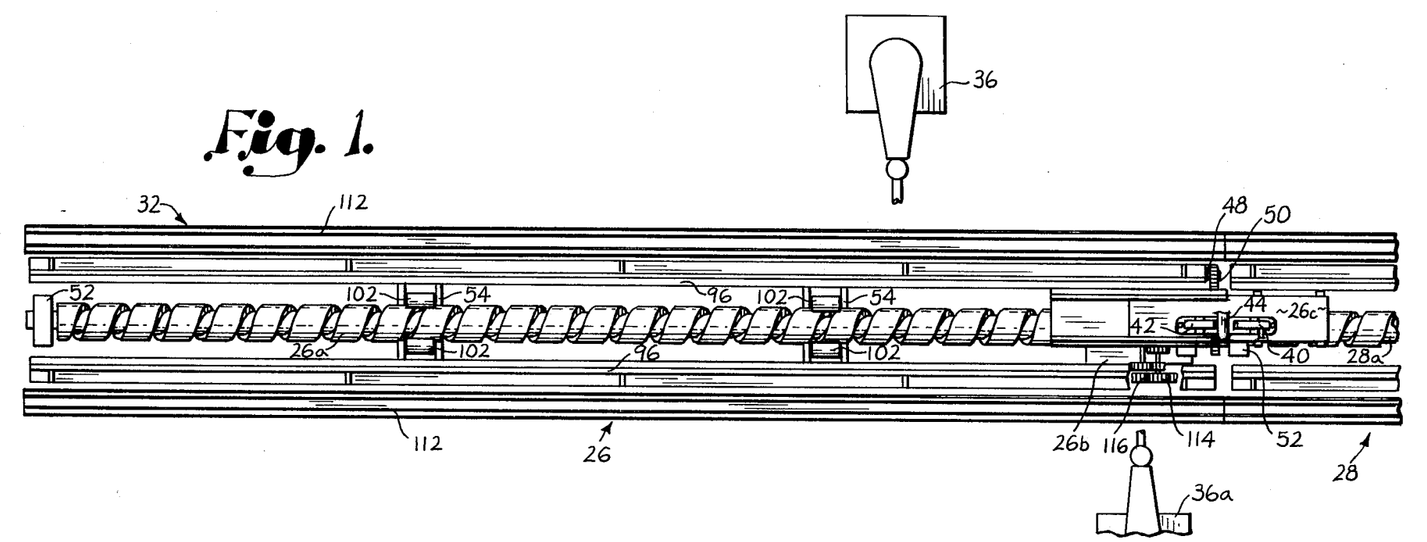
FIG. 1 is a fragmentary, plan view of the indexing conveyor of the present invention, showing an indexing section associated with a robot station and the beginning of the next indexing section, and further showing a shuttle carriage in motion to the right nearing the end of its path of travel.
Figure 2:
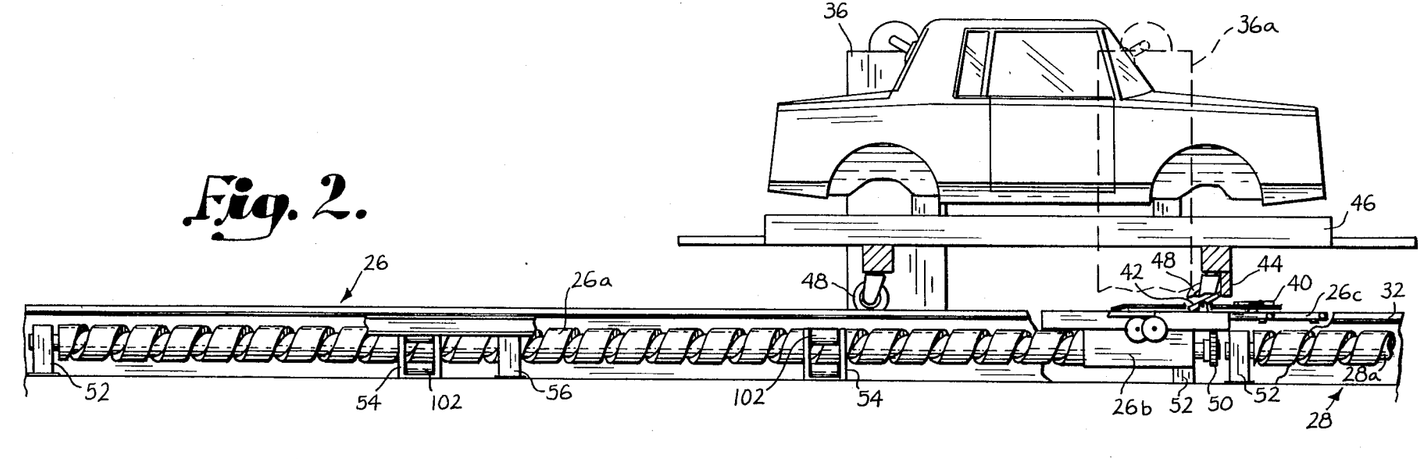
FIG. 2 is a fragmentary, elevational view of the conveyor components shown in FIG. 1 with the addition of the dolly and automobile product carried thereby, further showing the telescoping table of the shuttle carriage nearing full extension with the holdback dog cammed down.

FIGS. 1 and 2 show a fragmentary plan view and a fragmentary elevational view, respectively, of operating station unit 26 associated with robots 36 and 36a. The uniform helical drive shaft 26a can be seen in FIGS. 1 and 2 as can the shuttle carriage 26b for this operating station unit 26. FIG. 1 shows a plan view of a telescoping table 26c of the shuttle carriage 26b nearing its full extension to the right. FIG. 2 shows a holdback dog 40 located on the table 26c and cammed to a clearing position. The telescoping table 26c has positioned a drive dog 42, which is engaged with a striker bar 44 depending from the dolly 46, so as to push the striker bar and, therefore, the dolly 46 across to the transfer unit 28 for pickup by shuttle carriage 28b. Note that dolly 46 rolls upon the floor track 32 with the caster wheels 48 located therein.

FIG. 2 further illustrates that floor track 32 is supported by spaced column supports 56. The shuttle carriage 26b travels in parallelism with the axis of the drive shaft 26a which is intermediate and parallel to the two rails of the track 32. Drive shaft 26a is adjacent the floor and is rotated through the use of a variable speed motor 48 as seen in FIG. 1. A timing chain 50 forms the drive connection from the motor 48 to the shaft 26a. The drive shaft 26a is supported in journal boxes 52 near each of its ends and is intermediately supported as at 54.

PRODUCT ACCUMULATION UNIT

Figure 3:
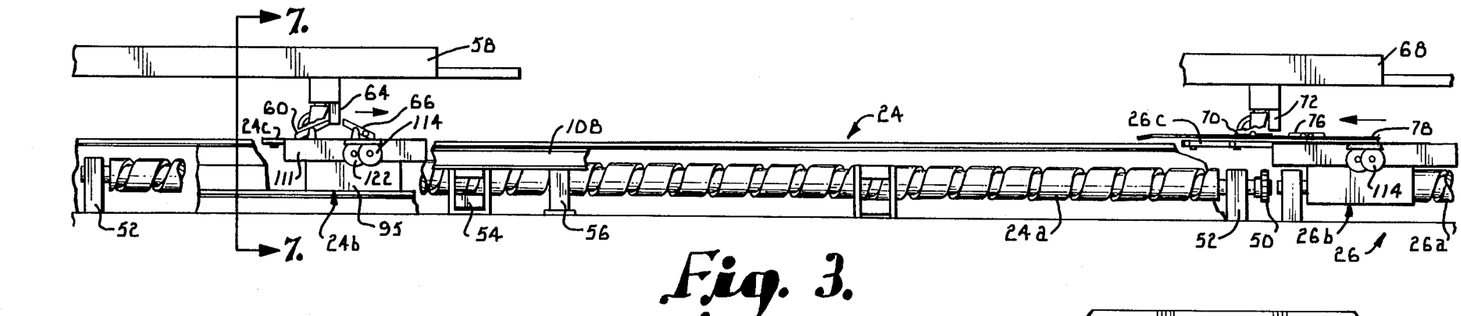
FIG. 3 is a fragmentary, elevational view of the indexing conveyor showing an accumulating section preceding the section fully shown in FIG. 1 and 2, the shuttle carriage seen in FIGS. 1 and 2 moving leftwardly and being near its home position to pick up another dolly, and the shuttle carriage of the accumulating section being shown in motion to the right to advance the next dolly and product.

FIG. 3 shows the product accumulation unit 24 preceding the operating station unit 26 shown in FIGS. 1, 2, 5 and 6. (Both the accumulation units and the operating station and transfer units comprise identical drive shafts and shuttle carriages.) The complete product accumulation unit 24 includes the uniform helical drive shaft 24a and accumulation shuttle carriage 24b, as shown in motion to the right in the process of presenting a dolly 58 for pickup by shuttle carriage 26b of the operating station unit 26. The dolly 58 is propelled to the right by engagement with the accumulation shuttle carriage 24b by means of a drive dog 60 located on the telescoping table 24c of shuttle carriage 24b. The drive dog 60 engages the striker bar 64 attached below the dolly 58. The holdback dog 66 is positioned so as to stop any forward movement of the striker bar 64 and, in turn, the dolly 58 while the dolly 58 is in positive motion.

Figure 11:
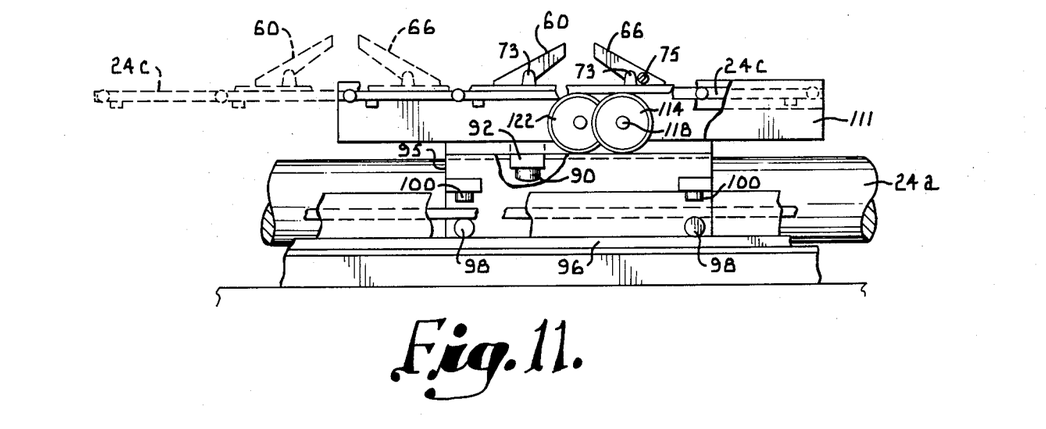
FIG. 11 is a side elevational view on a reduced scale of the carriage shown in FIG. 10, parts being broken away to reveal the telescoping table, and includes a phantom view of the telescoping table in a fully extended position to the left.

The operating station shuttle carriage 26b is seen in FIG. 3 moving leftwardly and near its home position to pick up dolly 68. The dolly 68 is in contact with a drive dog 70 and displaces the drive dog 70 into a clear position to allow the drive dog 70 to pass thereunder behind the striker bar 72. As best seen in FIG. 11, each of the various drive and holdback dogs described and illustrated herein is of the standard, counterweighted type mounted on a pivot 73 intermediate its ends, the holdback dog being provided with a cam follower 75 extending from the counterweighted end. When the operating station shuttle carriage 26b and its telescoping table 26c clear the striker bar 72, the drive dog 70 is counterweighted so as to return the drive dog to its normal position, similar to the position of drive dog 60 in FIG. 3. Note that the holdback dog 76 is cammed by ramp 78 so as to allow free rightward movement of the dolly 68 without interference from the holdback dog 76. The holdback dog 76 will return to its normal position, as seen by holdback dog 66 in FIG. 3, shortly after leaving the pickup zone. When the shuttle carriage 26b is in its home position and the table 26c thereon is fully extended to the left, the drive dog 70 will engage the striker bar 72 in order to pick up dolly 68 for advancement to its final, stationary position at the operating station where robotic operations are performed.

Figure 4:
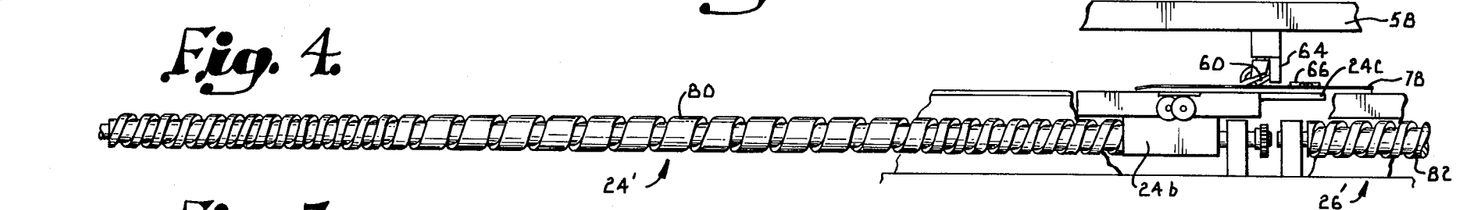
FIG. 4 is an elevational view similiar to FIG. 3 but showing an alternative drive shaft having a variable helical thread, the shuttle carriage there illustrated being shown with its telescoping table fully extended at the final position of the shuttle carriage.

FIG. 4 shows an alternative drive shaft 80 having a variable helical thread in contrast to the uniform helical thread shown in FIGS. 1-3. FIG. 4 presents a typical accumulation unit 24', and the fragment of a typical operating station unit 26' as seen in FIG. 3, but instead utilizes the variable helical drive shaft 80 in the accumulation unit and a variable helical drive shaft 82 in the operating station unit 26'. This variable helical drive shaft with a lesser pitch adjacent its ends could be used in place of uniform helical drive shafts in all indexer units. The accumulation shuttle carriage 24b is here illustrated showing its telescoping table 24c fully extended to the right at the shuttle carriage's final position in the accumulation unit 24'. Note that the drive dog 60 is still in an engaged position and that the holdback dog 66 is cammed down by ramp 78 in order that the striker bar 64 may clear so as to eliminate any interference with the dolly's further movement to the right. The camming of the holdback dog 66 also allows the telescoping table 24c of the shuttle carriage 24b to clear the striker bar 64 for return of the accumulation shuttle carriage 24b to its home position.

THE DRIVE

As seen in FIGS. 1 and 2, the drive shaft 26a there shown is typical of all units and has a uniform helical groove 88 cut within the circumference of the drive shaft. This helical groove 88 of constant pitch is best shown in the enlarged views of FIGS. 8 and 9, which also reveal two follower rollers 90 received in the groove 88 that are attached to a swivel bar 92 pivotally secured to the shuttle carriage and extending therebeneath.

Figure 7:
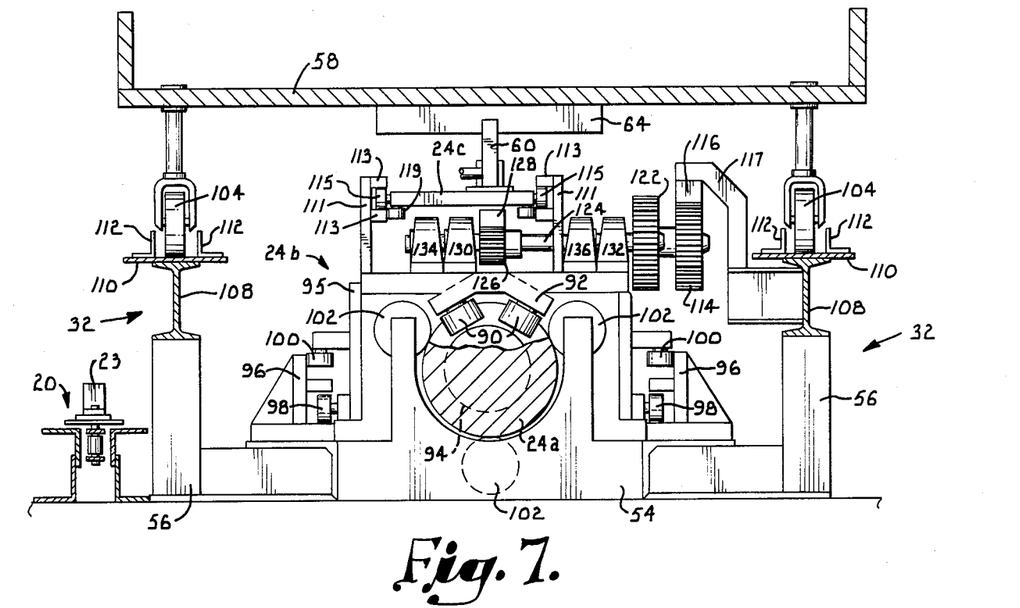
FIG. 7 is an enlarged, fragmentary, cross-sectional view taken along line 7—7 of FIG. 3, showing the shuttle carriage in detail.

FIG. 7 shows the shuttle carriage 24b from the rear. The shuttle carriage shown in FIG. 7 is typical of shuttle carriages in all indexer units. The swivel bar 92 is shown in FIG. 7 with the followers 90 riding within the uniform helical groove 88 of the drive shaft 24a. The solid core 94 of the drive shaft 24a is shown by phantom lines. One of the intermediate supports 54 is shown in detail and includes three rollers 102 positioned at apexes of an imaginary triangle and engaging shaft 24a to capture it and preclude any transverse movement. The shuttle carriage 24b comprises a base member 95 of inverted U-shaped configuration as viewed from the front or rear that rides upon a guide track 96 having a pair of parallel track segments located on opposite sides of the shuttle carriage parallel to the drive shaft. Front and rear rollers 98 (FIG. 11) rotatable on horizontal axes are carried by member 95 at its bottom side margins and engage the guide track 96 for movement thereon. Vertical rollers 100 located on the opposite sides of the shuttle carriage member 95 also engage the respective segments of guide track 96 and are provided in order to prevent canting of the shuttle carriage as it moves back and forth in the indexer unit.

Dolly 58 is shown in FIG. 7 with striker bar 64 located beneath the dolly 58 for engagement with drive dog 60. Dolly 58 travels along floor track 32 where casters 104 roll within the track 2. A typical dolly will have four casters to a dolly, two rolling on each side. The floor track 32 consists of the spaced columns 56 on each side of the shuttle carriage whereupon an I-beam 108 is supported on each series of columns and, additionally, a coextensive metal plate 110 overlies the I-beam 108. Upon the metal plate 110 angle irons 112 are spaced apart in opposed relationship in order to present a track within which casters 104 ride.

As shuttle carriage 24b moves back and forth in its travel the telescoping table 24c is constantly in motion relative to the movement of the shuttle carriage. The table 24c of the shuttle carriage 24b is geared to telescope to the left as the shuttle carriage travels in a leftward motion and to the right as the shuttle carriage undergoes rightward motion. The shuttle carriage is shown in a plan view in FIG. 10, in a rear view in FIG. 7, and is additionally shown in an elevational view in FIG. 11 on a reduced scale relative to FIG. 10. The table 24c is horizontally disposed and elongated in its directions of movement, and is carried by two spaced, upstanding side plates 111 on the top of base member 95. Each plate 111 is provided with a pair of vertically spaced, horizontally extending rails 113 which receive a corresponding series of rollers 115 along the adjacent longitudinal edge of the table 24c. Two rows of rollers 119 on vertical axes disposed on the underside of table 24c are engageable with respective lower rails 113 to impart lateral stability to the longitudinal motion of the table 24c.

Figure 10:
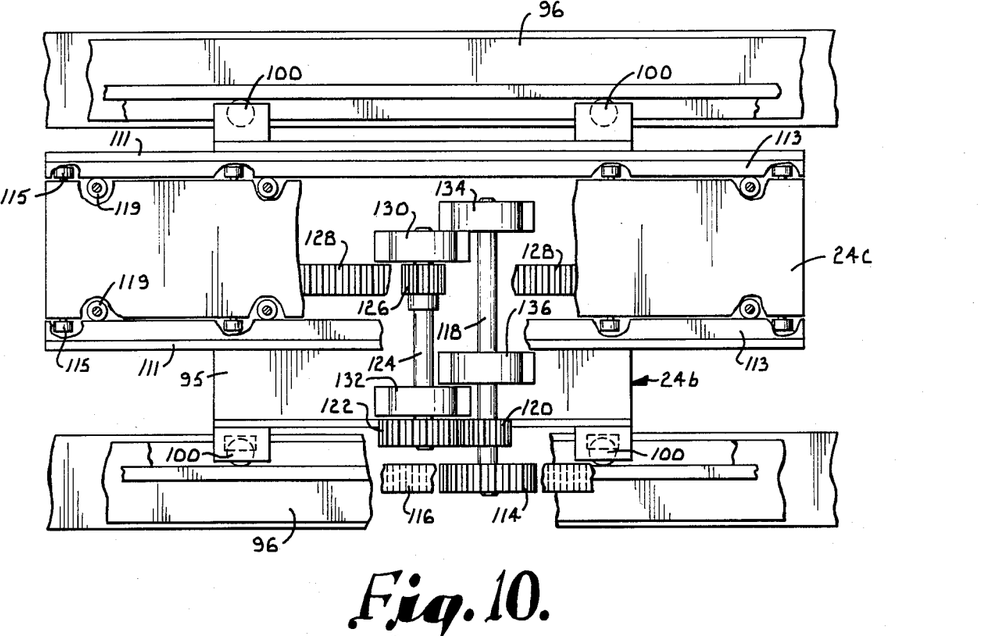
FIG. 10 is an enlarged, plan view of the shuttle carriage.

The table 24c is moved relative to the shuttle carriage 24b by a reduction gearing system beneath the table 24c as best seen in FIG. 10. A drive gear 114 meshes with an inverted rack 116 parallel to and substantially coextensive with the drive shaft 24a of the indexer unit and mounted by spaced arms 117 to the right I-beam 108. This rotates drive shaft 118 which, in turn, rotates intermediate gear 120 on drive shaft 118 in mesh with intermediate gear 122 and thereby rotates a shaft 124. Note that in FIG. 7 drive shaft 118 cannot be seen because it is hidden behind shaft 124. Shaft 124 in turn rotates pinion 126 which is rigid with shaft 124, the pinion 126 engaging an internal rack 128. The rack 128 is parallel to the axis of shaft 24a and is securely fastened to the underside of table 24c in order to present the geared face of the rack for enmeshment with pinion 126. Shaft 124 is secured to the shuttle carriage by journal boxes 130 and 132 on the top of member 95. Drive shaft 118 is secured to shuttle carriage 24b by journal boxes 134 and 136 which are also on top of member 95 beneath the table 24c.

The reduction gearing system as presented in FIG. 10 is designed so that when the drive gear 114 is rotated in a leftward direction (counter clockwise) the pinion 126 will drive the rack 128 leftwardly and therefore displace the table 24c leftwardly. FIG. 10 shows table 24c centered in relation to the shuttle carriage 24b, this positioning occuring when the shuttle carriage 24b has reached its midway point in relation to the ends of the drive shaft. As shuttle carriage 24b moves in a rightward direction the table 24c because of the reduction gearing will also move in a rightward direction a proportionally reduced distance.

FIG. 11 is a side elevational view on a reduced scale of the carriage shown in FIG. 10. The solid lines of table 24c, the drive dog 60, and holdback dog 66 represent the position of the table in relation to the shuttle carriage when the shuttle carriage is at its midway point in relation to the drive shaft, e.g. the shuttle carriage 24b would be centered 10 feet from each end of a 20-foot drive shaft. The phantom view of the table 24c, drive dog 60 and holdback dog 66 shows the telescoping table in a fully extended position to the left, as would be the relation of the components when the shuttle carriage is at its home position adjacent the left end of the respective drive shaft.

SUMMARY OF OPERATION

The operation of the indexing conveyor of the present invention will now be summarized with reference to the exemplary 4-section (or 4-unit) system disclosed herein, particularly FIGS. 5 and 6. At the left end of FIG. 6, it may be seen that the floor track 32 is already elevated in preparation for delivery of the dollies to the indexing conveyor. The moving chain conveyor 20 is likewise elevated to maintain engagement with dolly 30 until the chain is wiped out, which occurs at the first chain track offset 21 just prior to the course of the chain being directed downwardly and returned to floor level as seen in FIG. 6. It should be appreciated that at this time the pusher dog on the chain that was engaging the striker bar of dolly 30 is wiped out sidewise out of engagement with the striker bar so that the dolly is completely disengaged from the moving conveyor 20. (See FIG. 7 where the chain conveyor 20 is shown during its detour around the indexing conveyor and one of the upstanding pusher dogs 23 is illustrated.)

The shuttle carriage 22b in FIG. 6 is shown moving rightwardly away from its home position after picking up the dolly 30. It should be appreciated that at the extreme left or home position the telescoping table 22c has sufficient leftward reach to position its drive dog behind the striker bar of the dolly 30.

As discussed above, the function of the first indexer unit 22, in conjunction with the second unit 24, is to accumulate dollies and their products prior to delivery thereof to the operating station indexing unit 26. This is illustrated in FIG. 6 with respect to the dollies 30 and 34 as previously described. It is important to understand, however, that the drives for the two accumulator units 22 and 24 are entirely independent so that each accumulator unit can be controlled as desired to accomplish product accumulation. Accordingly, although manual control of the drive motor of each of the accumulator units could be employed, normally an automatic control system would program the operation of the accumulator units 22 and 24 in accordance with the time constraints dictated by the moving conveyor 20, such that each dolly and its associated product will be reunited with the moving conveyor 20 at the right end of the indexing conveyor (FIGS. 5 and 6) at the same point on the moving conveyor from which it was previously disengaged. In this manner, the manual operations performed on the products both prior to and subsequent to the indexing conveyor are not interrupted.

Likewise, the drive motors for the operating station indexing unit 26 and the transfer unit 28 are independently controlled and preferably programmed to provide a totally automatic indexing conveyor synchronized with the moving conveyor 20. In FIGS. 5 and 6 the shuttle carriage 26b has returned to its home position at the pickup zone where it will receive the next dolly (dolly 34) once it is delivered by the second accumulator unit 24. The shuttle carriage 28b of the transfer unit 28 is also in its home position ready to pull the dolly 38 from the robot station once the robotic operation is finished. Transfer back to the chain conveyor 20 is completed upon the advancement of carriage 28b to its final, extreme right position (not shown), at which time the telescoping table 28c will be fully extended to the right to position the striker bar of dolly 38 for re-engagement with a pusher dog on the chain conveyor 20 which is "wiped in" to a disposition adjacent the striker bar for re-engagement therewith as illustrated in FIGS. 5 and 6. The floor track 32 then has a downward incline and is returned to actual floor level along with the moving chain conveyor 20.

Figure 8:
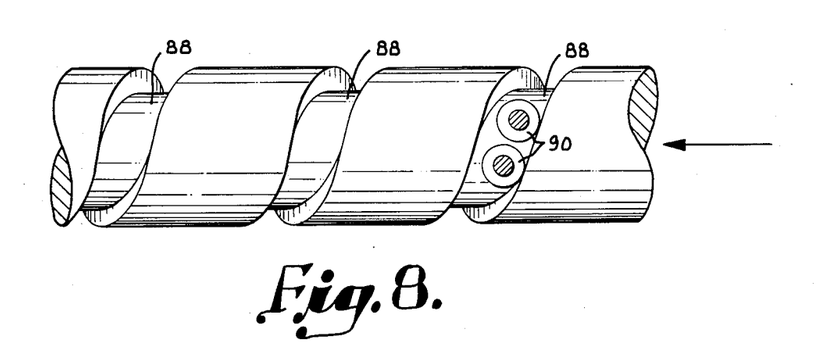
FIG. 8 is a greatly enlarged, fragmentary plan view of a portion of the drive shaft showing the followers on the shuttle carriage captured within the helical groove, the stems of the followers being shown in cross-section.
Figure 9:
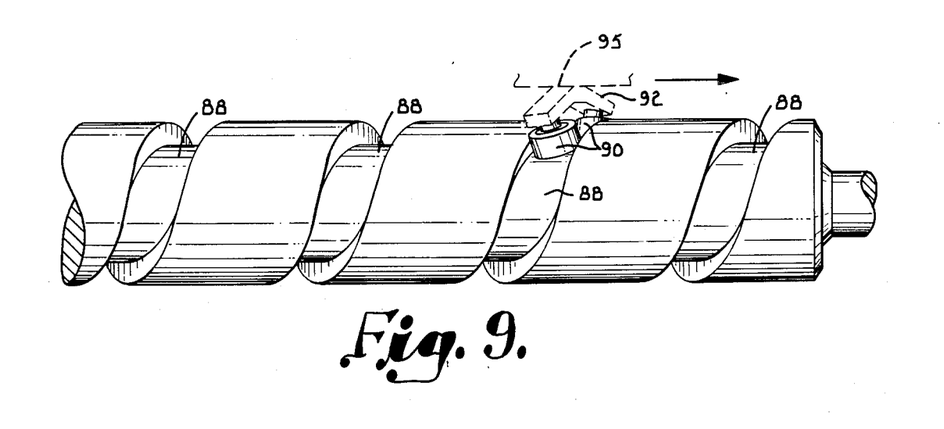
FIG. 9 is a side elevational view similiar to FIG. 8, additionally showing the swivel bar that mounts the followers beneath the carriage.

Since the chain conveyor 20 moves at constant speed, it is of course necessary to accelerate the products in their travel to the robot station so that they can be maintained thereat in a stationary position for the period of time required for the robotic operation. Accordingly, the motor speed (and hence the drive shaft speed) in each of the indexer units is varied between the home and final positions of the respective carriages in order to provide initial acceleration away from the home position followed typically by a period of constant speed, and then followed by deceleration to the final position which, in the case of the indexer unit 26, is the stationary position at the robot station. (It is understood that once delivered to the robot station, the robot mechanism holds the delivered dolly stationary and thus the shuttle carriage may commence reverse movement to the home position immediately after delivery of the dolly.) The threaded drive shaft of the present invention is particularly advantageous in this respect due to the high mechanical advantage obtained by engagement of the carriage followers 90 within the helical groove 88 as best seen in FIGS. 8 and 9. Furthermore, being captured within the groove 88, the drive is positive in nature and permits precise positioning of the shuttle carriage in its home and final positions at the opposed ends of the drive shaft.

As a typical example utilizing indexer units or sections that provide 18 feet (5.5 meters) of travel along the drive shaft, the shuttle carriage would be accelerated to a speed of 200 feet per minute (61 meters per minute) in the first 2½ feet (0.75 meter) of travel, maintained at a constant speed for 13 feet (4 meters), and then decelerated to a stationary position in the remaining 2½ feet (0.75 meter). It should be appreciated that this same acceleration and deceleration characteristic can be achieved using the variable pitch shaft 80 shown in FIG. 4, in which case the drive motor would turn at constant speed.

It should also be appreciated that the utilization of the telescoping table on each of the shuttle carriages effectively decreases the travel time of the dolly propelled by each indexing unit because of the left-to-right displacement of the table as the shuttle carriage moves from its home to its final position. The additional travel caused by this displacement also facilitates the pick up and delivery of the dollies since the telescoping table, upon which the drive and holdback dogs are mounted, has the ability to reach over the end of its associated drive shaft so that the drive dog can be properly positioned beneath a dolly to be picked up, and imparts to the shuttle carriage the capability at its final position of delivering the dolly to the next unit.

Having thus described the invention, what is claimed as new and desired to be secured by Letters Patent is:

1. Apparatus for indexing product-bearing carriers successively delivered to a pickup zone for stationary positioning of each product at an operating station, said apparatus comprising:

a shuttle carriage for propelling each product-bearing carrier along a path of travel extending from said pickup zone to said station, and having an initial position at said pickup zone and an advanced position at said station, said shuttle carriage being provided with an extensible portion movable in opposed directions along said path of travel and having means thereon engageable with a carrier at said pickup zone to couple the carriage and carriage together for movement in unison along said path, drive means for advancing said shuttle carriage from said initial position to said advanced position to deliver the transported carrier to said station, and subsequently moving said carriage in a reverse direction along said path to return it to said initial positon to pick up the next carrier, means coupled with said portion for extending the same in said reverse direction as the carriage approaches said initial position and for extending said portion in the opposite direction as the carriage approaches said advanced position, whereby to increase the reach of the shuttle carriage and the effective length of travel of the carrier-engaging coupling means as the carriage moves between said initial and advanced positions, and transfer means operable subsequent to arrival of said shuttle carriage at its advanced position for removing the transported carrier from said station, whereby said successively delivered carriers are consecutively indexed from said pickup zone to said station and transferred therefrom.

2. Apparatus as claimed in claim 1, wherein said shuttle carriage includes a base engaging said drive means and a shiftable table presenting said extensible portion, said extending means comprising a drive mechanism intercoupling the base and the table for causing the latter to shift relative to said base in said directions as the carriage is propelled between said positions thereof by said drive means.

3. Apparatus as claimed in claim 1, further comprising a first track for said carrier extending along said path of travel, and a second, parallel track upon which said carriage rides between said initial and advanced positions thereof, and wherein said means engageable with a carrier includes a dog on said carriage adapted for engagement with said carrier to couple the carriage and carrier together for movement along said tracks.

4. Apparatus for indexing successive products freed from a moving conveyor system for stationary positioning of each product at an operating station for a predetermined interval of time, and then returning each product to said moving conveyor system, said moving conveyor system conveying said products by engaging a plurality of sapced-apart carriers bearing the respective products, said apparatus comprising:

means for successively disengaging each of said carriers from said moving conveyor system and delivering each disengaged carrier to a pickup zone, an operating station indexer comprising a first shuttle carriage for propelling each disengaged carrier along a path of travel extending from said pickup zone to said station, said carriage having an initial position at said pickup zone and an advanced position at said station and further having means thereon engageable with a carrier at said pickup zone to couple the carriage and carrier together for movement in unison along said path, and drive means for advancing said carriage from said initial position to said advanced position to deliver the transported carrier to said station, and subsequently moving said carriage in a reverse direction along said path to return it to said initial position to pick up the next carrier, said disengaging and delivery means including a carrier accumulator comprising a second shuttle carriage for receiving each disengaged carrier at an initial position of said second carriage, and independent drive means for advancing said second carriage from its initial position to said pickup zone to deliver the carrier thereon to said first carriage and for returning said second carriage to its initial position to receive the next disengaged carrier, and transfer means operable subsequent to arrival of said first carriage at its advanced position for reengaging the carrier with said moving conveyor system, whereby said successively disengaged carriers are consecutively delivered to said pickup zone, indexed to said station and then reengaged with said moving conveyor system.

5. Apparatus as claimed in claim 4, wherein said drive means of the operating station indexer includes a drive shaft extending along said path and having a helical thread, follower means on said first shuttle carriage engaging said shaft in said thread, and means coupled with said shaft for rotating the same in one direction at a rotational speed causing said first shuttle carriage to advance to said station at a greater speed than that of said moving conveyor system, and for thereafter rotating said shaft in the opposite direction to move said first carriage in said reverse direction.

6. Apparatus as claimed in claim 5, wherein said drive shaft has a constant pitch, said rotating means being operable to vary the speed of said shaft to accelerate said first shuttle carriage during movement thereof away from said initial position and subsequently decelerate said first carriage to terminate advancement thereof at said advanced position.

7. Apparatus as claimed in claim 5, wherein said helical thread is variable and has a lesser pitch adjacent the ends of said drive shaft, said rotating means being operable to rotate said shaft at a constant speed to accelerate said first shuttle carriage as it advances from said initial position and subsequently decelerate said first carriage as it approaches said advanced position.

8. Apparatus as claimed in claim 4, wherein said first and second shuttle carriages are disposed in a substantially in-line relationship for successive shuttling of the disengaged carriers from the moving conveyor system to said operating station and then back to the moving conveyor system.

9. Apparatus as claimed in claim 8, wherein each of said shuttle carriages is provided with an extensible portion movable in opposed directions along the respective path of travel thereof, said portion being provided with said means engageable with a carrier, there being means coupled with said portion for extending the same in a reverse direction as the carriage approaches its initial position and for extending said portion in a forward direction as the carriage is advanced, whereby to increase the reach of each shuttle carriage and the effective legnth of travel of its carrier-engaging means as the carriage moves between initial and advanced positions thereof.

10. Apparatus as claimed in claim 4, wherein said transfer means comprises an additional shuttle carriage for receiving each arriving carrier at an initial position of said additional carriage, and independent drive means for advancing said additional carriage from its initial position to a position for reengagement with said moving conveyor system and for returning said additional carriage to its initial position to receive the next arriving carrier.

11. Apparatus as claimed in claim 10, wherein said first, second and additional shuttle carriages are disposed in a substantially in-line relationship for successive shuttling of the disengaged carriers from the moving conveyor system to said operating station and then back to the moving conveyor system.

12. Apparatus for indexing successive products free from a moving conveyor system for stationary positioning of each product at an operating station for a predetermined interval of time, and then returning each product to said moving conveyor system, said moving conveyor system conveying said products by engaging a plurality of spaced-apart carriers bearing the respective products, said apparatus comprising:

means for successively disengaging each of said carriers from said moving conveyor system and delivering each disengaged carrier to a pickup zone, an operating station indexing unit comprising a first shuttle carriage for propelling each disengaged carrier along a path of travel extending from said pickup zone to said station, said carriage having an initial position at said pickup zone and an advanced position at said station and further having means thereon engageable with a carrier at said pickup zone to couple the carriage and carrier together for movement in unison along said path, and drive means for advancing said carriage from said initial position to said advanced position to deliver the transported carrier to said station, and subsequently moving said carriage in a reverse direction along said path to return it to said initial position to pick up the next carrier, and transfer means operable subsequent to arrival of said first carraige at its advanced position for reengaging the carrier with said moving conveyor system, and comprising a second indexing unit having a second shuttle carriage for receiving each arriving carrier at an initial position of said second carriage, and independent drive means for advancing said second carriage from its initial position to a position for reengagement of the transported carrier with said moving conveyor system and for returning said second carriage to its initial position to receive the next arriving carrier, whereby said successively disengaged carriers are consecutively indexed from said pickup zone to said station and then reengaged with said moving conveyor system.

13. Apparatus as claimed in claim 12, wherein said first and second shuttle carriages are disposed in a substantially in-line relationship for successive shuttling of the disengaged carriers from the moving conveyor system to said operating system and then back to the moving conveyor system.

14. Apparatus as claimed in claim 13, wherein each of said shuttle carriages is provided with an extensible portion movable in opposed directions along the respective path of travel thereof, said portion being provided with said means engageable with a carrier, there being means coupled with said portion for extending the same in a reverse direction as the carriage approaches its initial position and for extending said portion in a forward direction as the carriage is advanced, whereby to increase the reach of each shuttle carriage and the effective length of travel of its carrier-engaging means as the carriage moves between initial and advanced positions thereof.

15. A method of indexing successively conveyed, product-bearing carriers to position each carrier at an operating station for a predetermined interval of time, and then transferring each product-bearing carrier to a handling system for subsequent disposition thereof, said method comprising the steps of:

(a) providing a plurality of tandem indexer units, including an accumulator unit and an operating station unit;

(b) providing said accumulator unit with a first shuttle carriage movable along a first path of travel extending from an initial position of said carriage to an advanced position thereof at a pickup zone;

(c) successively delivering each of said carriers to said accumulator unit;

(d) coupling a delivered carrier to said first shuttle carriage at said initial position thereof for movement of the carrier and carriage in unison along said first path;

(e) advancing said first shuttle carriage to said pickup zone to deliver the transported carrier thereto, and then uncoupling the first carriage from the carrier and reversing the direction of movement thereof to return it to its initial position;

(f) providing said operating station unit with a second shuttle carriage movable along a second path of travel from said pickup zone to said operating station;

(g) coupling a delivered carrier at said pickup zone to said second shuttle carriage of the operating station unit for movement in unison along said second path;

(h) advancing said second shuttle carriage from said pickup zone to said operating station to deliver the transported carrier to said station, and then uncoupling the second carriage from the carrier and reversing the direction of movement of the second carriage to return it to the pickup zone;

(i) repeating said steps (c), (d), (e), (g) and (h) to continuously accumulate carriers and then index each individual carrier to said operating station; and (j) transferring each carrier from said operating station to said handling system after said predetermined time interval has elapsed, whereby said successively delivered carriers are consecutively accmulated, indexed to said operating station and then transferred to said handling system.

16. The method as claimed in claim 15, wherein said plurality of tandem indexer units further includes a transfer unit having a third shuttle carriage movable along a third path of travel extending from said operating station to an advanced position thereof, said step (j) of transferring each carrier from said operating station to said handling system being accomplished by coupling a carrier at said operating station with said third carriage and advancing the latter from said station to said advanced position of the third carriage to present the advanced carrier to said handling system, and then uncoupling the third carriage from the carrier and reversing the direction of movemunt of the third carriage to return it to the operating station.

17. The method as claimed in claim 15, wherein each of said steps (e) and (h) includes advancing and reversing the respective shuttle carriage with a rotatable drive shaft having a helical thread, by rotating said shaft in one direction to advance the carriage and in the opposite direction to effect said reverse movement thereof.

18. A method of indexing successively conveyed, product-bearing carriers to position each carrier at an operating station for a predetermined interval of time, and then transferring each product-bearing carrier to a handling system for subsequent disposition thereof, said method comprising the steps of:

(a) providing a plurality of tandem indexer units, including an operating station unit and a transfer unit;

(b) providing said operating station unit with a first shuttle carriage movable along a first path of travel extending from a pickup zone to said operating station;

(c) successively delivering each of said carriers to said pickup zone;

(d) coupling a delivered carrier at said pickup zone to said first shuttle carriage for movement of the carrier and carriage in unison along said first path;

(e) advancing said first shuttle carriage to said operating station to deliver the transported carrier thereto, and then uncoupling the first carriage from the carrier and reversing the direction of movement thereof to return it to the pickup zone;

(f) providing said transfer unit with a second shuttle carriage movable along a second path of travel from said operating station to an advanced position thereof;

(g) coupling a delivered carrier at said operating station to said second shuttle carriage of the transfer unit for movement in unison along said second path;

(h) after said predetermined time interval has elapsed, advancing said second shuttle carriage from said operating station to said advanced position to deliver the transported carrier to said handling system, and then uncoupling the second carriage from the carrier and reversing the direction of movement of the second carriage to return it to the operating station; and (i) repeating said steps (c), (d), (e), (g) and (h) to continuously index successive carriers to said operating station and then transfer the carriers to said handling system.

19. The method as claimed in claim 18, wherein each of said steps (e) and (h) includes advancing and reversing the respective shuttle carriage with a rotatable drive shaft having a helical thread, by rotating said shaft in one direction to advance the carriage and in the opposite direction to effect said reverse movement thereof.

* * * * *